US009800720B2

(12) United States Patent
Lu et al.

(10) Patent No.: US 9,800,720 B2
(45) Date of Patent: Oct. 24, 2017

(54) SYSTEMS AND METHODS FOR DETERMINING NON-LINEAR PRECODING COEFFICIENTS

(71) Applicant: Telefonaktiebolaget L M Ericsson (publ), Stockholm (SE)

(72) Inventors: Chenguang Lu, Sollentuna (SE); Per-Erik Eriksson, Stockholm (SE); Aldebaro Klautau, Belem (BR); Francisco Müller, Belem (BR); Keke Zu, Stockholm (SE)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 122 days.

(21) Appl. No.: 14/568,678

(22) Filed: Dec. 12, 2014

(65) Prior Publication Data

US 2016/0173682 A1    Jun. 16, 2016

(51) Int. Cl.
| | | |
|---|---|---|
| *H04M 1/76* | (2006.01) | |
| *H04M 7/00* | (2006.01) | |
| *H04M 9/00* | (2006.01) | |
| *H04M 3/18* | (2006.01) | |
| *H04B 3/32* | (2006.01) | |
| *H04M 3/00* | (2006.01) | |

(52) U.S. Cl.
CPC ............. *H04M 3/18* (2013.01); *H04B 3/32* (2013.01); *H04M 3/002* (2013.01)

(58) Field of Classification Search
CPC ......... H04B 3/32; H04M 11/062; H04M 3/34; H04M 3/18
USPC ........................................................ 379/417
See application file for complete search history.

(56) References Cited

U.S. PATENT DOCUMENTS

| | | | | |
|---|---|---|---|---|
| 2006/0274825 | A1* | 12/2006 | Cioffi ................ | H04L 25/03343 375/222 |
| 2007/0274404 | A1* | 11/2007 | Papandriopoulos ..... | H04B 3/32 375/260 |
| 2013/0215935 | A1* | 8/2013 | Nuzman ................. | H04B 3/32 375/219 |

OTHER PUBLICATIONS

Author Unknown, "Fast access to subscriber terminals (G.fast)—Power spectral density specification," ITU-T G.9700, Series G: Transmission Systems and Media, Digital Systems and Networks, Apr. 2014, 22 pages.

(Continued)

*Primary Examiner* — Alexander Jamal
(74) *Attorney, Agent, or Firm* — Withrow & Terranova, PLLC (57) ABSTRACT

Systems and methods for determining non-linear precoding coefficients are disclosed. In some embodiments, a method of determining non-linear precoding coefficients for transmitting at least one frequency tone on lines includes obtaining a channel matrix that relates an input of the lines to an output of the lines for the at least one frequency tone. The method also includes computing a metric for each line in a subset of the lines and determining a line order for the subset of the lines based on the metric for each line in the subset of the lines. The method also includes reordering elements of the channel matrix based on the line order for the subset of the lines to create a reordered channel matrix and determining the non-linear precoding coefficients based on the reordered channel matrix. This may provide a systematic way to sort lines and balance the bit rates between different lines.

17 Claims, 9 Drawing Sheets

(56) References Cited

OTHER PUBLICATIONS

Author Unknown, "Fast Access to Subscriber Terminals (FAST)—Physical layer specification," ITU-T G.9701, Series G: Transmission Systems and Media, Digital Systems and Networks, Dec. 2014, 340 pages.

Author Unknown, "Self-FEXT cancellation (vectoring) for use with VDSL2 transceivers," ITU-T G.993.5, Series G: Transmission Systems and Media, Digital Systems and Networks, Apr. 2010, 80 pages.

Alcatel-Lucent, "G.fast: Comparison of linear and non-linear precoding," Contribution ITU-T 2013-01-Q4-046, ITU—Telecommunication Standardization Sector, Jan. 28-Feb. 1, 2013, Geneva, Switzerland, 8 pages.

Assia, Inc., "G.fast: Non-Linear Precoder Ordering," International Telecommunication Union, Telecommunication Standardization Sector, Study Period 2013-2016, Study Group 15, Contribution 0261, COM 15—C 0261—E, Dec. 2014, 5 pages.

BT, "G.fast: Release of BT cable measurements for use in simulations," Contribution ITU-T 2013-01-Q4-066, ITU—Telecommunication Standardization Sector, Jan. 28-Feb. 1, 2013, Geneva, Switzerland, 2 pages.

Cendrillon, Raphael et al., "A Near-Optimal Linear Crosstalk Precoder for Downstream VDSL," IEEE Transactions on Communications, vol. 55, No. 5, May 2007, pp. 860-863.

Cendrillon, Raphael et al., "A Near-Optimal Linear Crosstalk Canceler for Upstream VDSL," IEEE Transactions on Signal Processing, vol. 54, No. 8, Aug. 2006, pp. 3136-3146.

Cendrillon, Raphael et al., "A Near-Optimal Linear Crosstalk Canceler for VDSL," Submitted to IEEE Transactions on Signal Processing, 2004, 11 pages.

Ginis, G. et al., "A Multi-user Precoding Scheme achieving Crosstalk Cancellation with Application to DSL Systems," Thirty-Fourth Asilomar Conference on Signals, Systems and Computers, 2000, pp. 1627-1631.

Ikanos Communications, "G.fast: Constellations for use with Non-Linear Pre-coding," Contribution ITU-T 2013-01-Q4-028, ITU—Telecommunication Standardization Sector, May 7-11, 2012, Geneva, Switzerland, 6 pages.

Oksman, Vladimir et al., "The ITU-T's New G.vector Standard Proliferates 100 Mb/s DSL," IEEE Communications Magazine, Oct. 2010, pp. 140-148.

Yu, Wei et al., "Trellis and Convolutional Precoding for the Transmitter-Based Interference Pre-Subtraction," IEEE Transactions on Communications, vol. 53, Issue 7, Jul. 18, 2005, 20 pages.

Wübben, Dirk et al., "MMSE Extension of V-BLAST based on Sorted QR Decomposition," IEEE 58th Vehicular Technology Conf. (VTC) Fall, Orlando, Florida, USA, Oct. 2003, 5 pages.

\* cited by examiner

SYSTEMS AND METHODS FOR DETERMINING NON-LINEAR PRECODING COEFFICIENTS

FIELD OF THE DISCLOSURE

The present disclosure relates to determining non-linear precoding coefficients.

BACKGROUND

A next generation Digital Subscriber Line (DSL) system, G.fast, is currently being standardized by the International Telecommunication Union-Telecommunication Standardization Sector (ITU-T). Current specifications have been drafted as ITU-T G.9700 and G.9701. G.fast is also referred to as a Fiber-to-the-Distribution-Point (FTTdp) system, where Digital Subscriber Line Access Multiplexers (DSLAMs) are located in the last distribution point in the copper loop, up to 250 meters away from the end users. At such short distances, much higher frequencies should be used, e.g. up to 200 Megahertz (MHz) or more. For these higher frequencies, especially higher than 100 MHz, when multiple lines are located together, the crosstalk levels relative to the direct channel gain are considerably increased compared to Very-high-bit-rate DSL 2 (VDSL2) frequencies (up to 30 MHz), and therefore an efficient crosstalk cancellation scheme is vital.

One way to reduce crosstalk among lines is vectoring. Vectoring was first standardized in 2010 for VDSL2 in the ITU-T G.993.5 recommendation to cancel out crosstalk below 30 MHz. In VDSL2, linear cancellation schemes based on the Zero-Forcing (ZF) criterion are used on the DSLAM side with a linear precoder for downstream and a linear crosstalk canceler in upstream. It has been shown that the linear cancellation schemes specified in ITU-T G.993.5 approach the crosstalk-free single-line performance (i.e., the performance a line would achieve if it were not located with other lines). The reason the linear schemes achieve the near-optimal performance is that a channel matrix, H, is Row-Wise Diagonal Dominant (RWDD) and column-wise diagonal dominant (CWDD) in downstream and upstream, respectively, hence the crosstalk channel is much lower than the direct channel.

In the G.fast standardization, it has been agreed to have vectoring mandatory in order to transmit at high frequencies and achieve a very high data rate of up to 1 Gigabit Per Second (Gbps) aggregated. However, the linear cancellation schemes are not good to use in G.fast, especially for downstream transmission. The channel matrix, H, at high frequencies in G.fast presents much higher crosstalk relative to the direct channel gain than at VDSL frequencies. In measurements, the crosstalk channel has been shown, in some occasions, to be even stronger than the direct channel in high frequencies. This strong crosstalk results in the output signal per port being amplified considerably by the linear precoder. Power normalization at each tone is required to keep the signal power below the Power Spectral Density (PSD) mask. The power normalization degrades the performance significantly when crosstalk is high in higher frequencies.

Therefore, it has been agreed in G.fast that in phase 1 (up to 106 MHz frequency), a linear precoder should be used. In phase 2 (upgrading to support up to 212 MHz), the non-linear Tomlinson-Harashima Precoder (THP) should be used. Unlike the ZF-based linear precoder, which inverts the channel matrix, H, in order to cancel crosstalk, the non-linear precoder is based on the QR decomposition of the conjugate transpose of the channel matrix:

$$H^* = QR \quad (1)$$

where Q is an N×N unitary matrix and R is an upper triangular matrix. The transmitted signal vector x is defined as:

$$x = Qx' \quad (2)$$

where x' is an N×1 vector, representing a precoded version of the original signal vector $\tilde{x}$. Denoting the noise by n, the received signal y is:

$$y = Hx + n \quad (3)$$

$$y = HQx' + n \quad (4)$$

$$y = R^*Q^*Qx' + n \quad (5)$$

$$y = R^*x' + n \quad (6)$$

The received signal will be crosstalk free when:

$$S\tilde{x} = R^*x' \quad (7)$$

where S is an N×N diagonal matrix in which the diagonal elements are equal to the diagonal elements of R*. Solving equation (7), the precoding operation is defined as:

$$x'_1 = \tilde{x}_1 \quad (8)$$

$$x'_2 = \tilde{x}_2 - \frac{r_{2,1}}{r_{2,2}} x'_1 \quad (9)$$

$$\vdots$$

$$x'_N = \tilde{x}_N - \frac{r_{N,N-1}}{r_{N,N}} x'_{N-1} - \cdots - \frac{r_{N,1}}{r_{N,N}} x'_1 \quad (10)$$

where $x'_i$ denotes the elements of x', $\tilde{x}_i$ represent the elements of $\tilde{x}$ and $r_{i,j}$ are the elements of R.

The precoding operation in equations (8) through (10) may lead to a significant increase in the energy of x' compared to x. To avoid this, a modulo arithmetic operation is applied to the elements in equations (8) through (10). The modulo arithmetic operation is defined as follows:

$$\Gamma_{M_i}[x] = x - M_i \left\lfloor \frac{x + M_i/2}{M_i d} \right\rfloor \quad (11)$$

where x is the received symbol from a Pulse-Amplitude Modulation (PAM) constellation, d is the distance between symbols in the PAM constellation and $M_i$ is the PAM constellation order. Viewing Quadrature-Amplitude Modulation (QAM) as two orthogonal PAM constellations, the corresponding modulo operation is defined as $\Gamma\sqrt{M_i}[x] = \Gamma\sqrt{M_i}[\Re(x)] + j\Gamma\sqrt{M_i}[\Im(x)]$.

$$x'_1 = \tilde{x}_1 \quad (12)$$

$$x'_2 = \Gamma_{M_2}\left[\tilde{x}_2 - \frac{r_{2,1}}{r_{2,2}} x'_1\right] \quad (13)$$

$$\vdots$$

$$x'_N = \Gamma_{M_N}\left[\tilde{x}_N - \frac{r_{N,N-1}}{r_{N,N}} x'_{N-1} - \cdots - \frac{r_{N,1}}{r_{N,N}} x'_1\right] \quad (14)$$

Mathematically, the received signal can be expressed as $y_i = r_{i,i}\tilde{x}_{i,i} + n_i$. At the receiver, the same modulo operation is applied to recover the signal:

$$\hat{y}_i = \Gamma_{M_i}\left[\frac{y_i}{r_{i,i}}\right] \quad (15)$$

Therefore, the Signal-to-Noise Ratio (SNR) of the i-th received signal is obtained as:

$$SNR_{THP} = \frac{\tilde{\xi}_i |r_{i,i}|^2}{\sigma_i^2} \quad (16)$$

where $\tilde{\xi}_i$ is the average energy of $\tilde{x}_i$ and $\sigma_i^2$ the noise variance.

After the modulo arithmetic operation, the transmitted signal may still suffer an energy increase, which for square-QAM constellations is $M_i/(M_i-1)$, where $M_i$ is the QAM modulation order for line i. For non-square QAM constellations, the relationship is more irregular. In *G.fast: Constellations for use with Non-Linear Pre-coding*, Ikanos, Switzerland: Contribution ITU-T 2013-01-Q4-02, 2013, the calculation of the energy factors for all the QAM constellations used in VDSL2 in the range 4 to 4096 is presented. The energy increasing factors are summarized in Table 1. Table 1 shows that the even-bit QAM modulation orders have much lower energy increases than those of the odd-bit QAM modulation orders.

TABLE 1

| Energy increase in dB for the THP | |
|---|---|
| Modulation order (b bits) | Energy increase in dB |
| 4 (2) | 1.25 |
| 8 (3) | 2.50 |
| 16 (4) | 0.280 |
| 32 (5) | 0.79 |
| 64 (6) | 0.0684 |
| 128 (7) | 0.68 |
| 256 (8) | 0.0170 |
| 512 (8) | 0.66 |
| 1024 (9) | 0.0042 |
| 2048 (10) | 0.65 |
| 4096 (11) | 0.0011 |

Although THP non-linear precoding achieves higher system capacity than the ZF-based linear precoder, there is still a need for systems and methods for determining non-linear precoding coefficients.

SUMMARY

Systems and methods for determining non-linear precoding coefficients are disclosed. In some embodiments, a method of determining non-linear precoding coefficients for transmitting at least one frequency tone on lines is provided. The method includes obtaining a channel matrix, H, that relates an input of the lines to an output of the lines for the at least one frequency tone. The method also includes computing a metric for each line in a subset of the lines and determining a line order for the subset of the lines based on the metric for each line in the subset of the lines. The method also includes reordering elements of the channel matrix, H, based on the line order for the subset of the lines to create a reordered channel matrix, H' and determining the non-linear precoding coefficients based on the reordered channel matrix, H'. Thus, in some embodiments, this may provide a systematic way to sort lines and balance the bit rates between different lines. This also allows group ordering by weighting the rate balancing metric differently for different lines.

In some embodiments, the subset of the lines includes all of the lines. In other embodiments, the subset of the lines includes less than all of the lines.

In some embodiments, determining the line order for the subset of the lines and reordering the elements of the channel matrix, H, includes, for each line in the subset of the lines, determining a line from the subset of the lines to be ordered next based on the metric for each line in the subset of the lines yet to be ordered; setting the next elements of the reordered channel matrix, H' to be the elements of the channel matrix, H, corresponding to the line to be ordered next; and computing the metric for each line in the subset of the lines yet to be ordered based on the reordered channel matrix, H'.

In some embodiments, computing the metric for each line in the subset of the lines includes computing the metric for each line in the subset of the lines based on the elements of the channel matrix, H, corresponding to each line.

In some embodiments, computing the metric for each line in the subset of the lines includes computing the metric for each line in the subset of the lines as a value proportional to a difference between a total energy of a channel vector and a direct channel energy of the channel vector corresponding to each line.

In some embodiments, computing the metric for each line in the subset of the lines includes computing the metric for each line in the subset of the lines as $(\|h_i\|^2 - |h_{ii}|^2)/|h_{ii}|^2$ where $h_i$ is the channel vector corresponding to each line, and $h_{ii}$ is the direct channel gain of the channel vector corresponding to each line.

In some embodiments, determining the line order includes ordering the subset of the lines in decreasing order of the metric for each line in the subset of the lines.

In some embodiments, the method additionally includes multiplying the metric for each line by a corresponding weighting coefficient prior to determining the line order for the subset of the lines.

In some embodiments, each line in the subset of the lines belongs to one of a group, and for each line in the subset of the lines, the weighting coefficient is a predetermined value based on the group to which the line belongs.

In some embodiments, for each line in the subset of the lines, the weighting coefficient is based on the length of the line. In some embodiments, for each line in the subset of the lines, the weighting coefficient is based on a subscription level of a user of the line.

In some embodiments, the at least one frequency tone is a group of frequency tones. In other embodiments, the at least one frequency tone is a single frequency tone. In some embodiments, each of the at least one frequency tone is at least 100 Megahertz (MHz). In some embodiments, determining the non-linear precoding coefficients includes determining the non-linear precoding coefficients for Tomlinson-Harashima precoding. In some embodiments, each of the lines is a Digital Subscriber Line (DSL) operating according to the G.fast standard.

In some embodiments, a DSL Access Multiplexer (DSLAM) is provided. The DSLAM includes a transceiver for transmitting at least one frequency tone on a line, at least one processor, and memory. The memory contains software executable by the at least one processor whereby the DSLAM is operative to obtain a channel matrix, H, that relates an input of the lines to an output of the lines for the at least one frequency tone. The DSLAM is also operative to compute a metric for each line in a subset of the lines and determine a line order for the subset of the lines based on the metric for each line in the subset of the lines. The DSLAM is also operative to reorder elements of the channel matrix, H, based on the line order for the subset of the lines to create a reordered channel matrix, H' and determine non-linear precoding coefficients based on the reordered channel matrix, H'. A functional block that performs vectoring related operations may also be referred to as Vectoring Control Entity (VCE). A VCE may be inside a DSLAM. A VCE may also be outside a DSLAM, especially when the vectoring works across multiple DSLAMs connected to the twisted pairs in the same cable bundle.

Those skilled in the art will appreciate the scope of the present disclosure and realize additional aspects thereof after reading the following detailed description of the embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

DETAILED DESCRIPTION

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Figure 1:
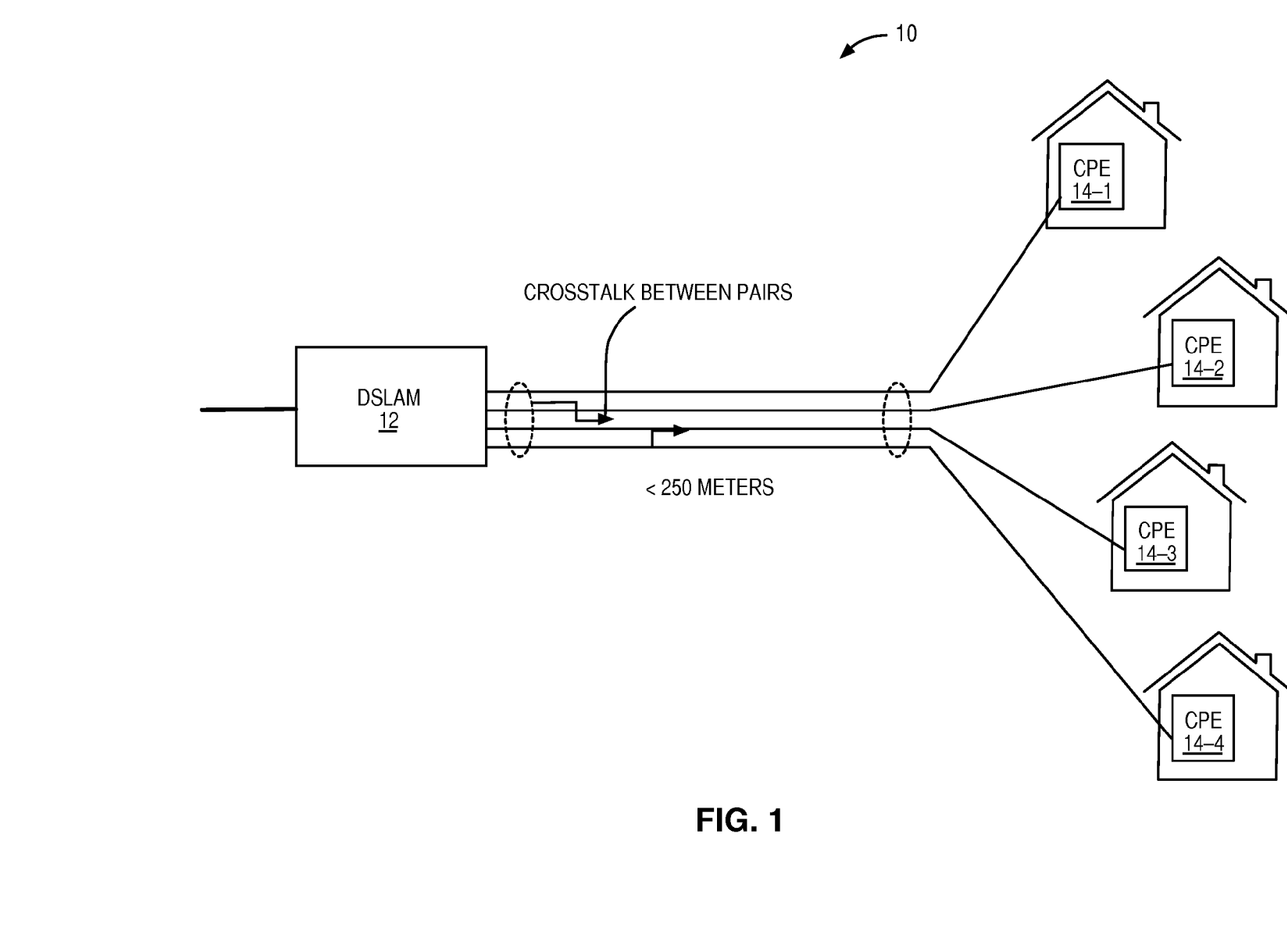
FIG. 1 is a diagram depicting an exemplary communications network.

Before discussing the embodiments of the current disclosure, an exemplary communications network 10 for communications between a Digital Subscriber Line Access Multiplexer (DSLAM) 12 and Customer Premises Equipments (CPEs) 14-1 through 14-4 (referred to herein as CPE 14 or CPEs 14) is discussed. DSLAM 12 includes lines connected to CPEs 14. In this exemplary communications network 10, the DSLAM 12 communicates with the CPEs 14 using the G.fast standard. While G.fast is used in these examples, the current disclosure is not limited thereto.

In FIG. 1, DSLAM 12 is located less than 250 meters away from the CPEs 14. At such short distances, much higher frequencies can be used, e.g. up to 200 Megahertz (MHz) or more. For these higher frequencies, especially higher than 100 MHz, when multiple lines are located together, the crosstalk levels relative to the direct channel gain are considerably increased compared to Very-high-bit-rate DSL 2 (VDSL2) frequencies (up to 30 MHz) and therefore an efficient crosstalk cancellation scheme is vital. It has been agreed in G.fast that the next amendment of G.fast shall specify mandatory support for both linear and non-linear precoding downstream in a new 106 MHz profile. This may be extended to 212 MHz after further studies in ITU-T. The non-linear precoder that has been discussed to use is the non-linear Tomlinson-Harashima Precoder (THP). Unlike the ZF-based linear precoder, which inverts the channel matrix, H, in order to cancel crosstalk, the non-linear precoder is based on the QR decomposition of the conjugate transpose of the channel matrix.

Although the THP achieves higher system capacity than the ZF linear precoder, one potential issue is that the performance of an individual line varies due to the line ordering in the QR decomposition. In QR decomposition, an orthogonal basis $\{e_1 \, e_2 \, \ldots \, e_N\}$ is formed in the channel vector space H*, where $e_i$ is the $i^{th}$ orthogonal base vector. As shown in equation (16) above, the effective channel gain of the $i^{th}$ line in the line order, $r_{ii}$ is the projection from the channel vector of the line to the corresponding $i^{th}$ orthogonal base vector. The orthogonal basis depends on how the lines are ordered in QR decomposition. Therefore, the effective channel gain (i.e. the projection) also varies. It can especially be shown in the following derivation that the magnitude of the effective channel gain of a line tends to decrease if the line is ordered last in the matrix. As a result, a line ordered earlier in the order tends to achieve better bit rate than if it is ordered later.

As used herein, an original channel matrix is defined as $H=[h_1; h_2; \ldots; h_N]$ where $h_i=[h_{i1} h_{i2} \ldots h_{iN}]$ is the $i^{th}$ row vector, in which $h_{ii}$ is the direct channel coefficient, and $h_{ij}$ is the crosstalk channel coefficient from line j to line i. In practice, the actual channel matrix may not be known. The systems and methods disclosed herein are equally applicable an estimated channel matrix. For the THP operations, the order of the row vectors can be arbitrarily changed. In this example, without loss of generality, only the row index of $h_1$ is changed while other rows just shift up accordingly. $H_m$ defined as the reordered matrix when $h_1$ is placed on row m. For example, $H_3=[h_2; h_3; h_1; h_4; h_5 \ldots; h_N]$.

According to equation (16) without considering power normalization, the effective channel gain of line 1 when it is placed at the $m^{th}$ row is $r_{mm, m}$, and the $m^{th}$ diagonal element of R matrix of the channel matrix $(H_m)^*$. Below is a proof that $r_{mm,\,m} < r_{(m+1)(m+1),m}$ following the Gram-Schmidt process for QR decomposition.

Define $e_{i,m}$ as the $i^{th}$ orthogonal base vector when line 1 is ordered as the $m^{th}$ channel vector, i.e. the corresponding channel matrix is $H_m$. When m=1, $$e_{1,1} = \frac{h_1^*}{\|h_1^*\|},$$

$r_{11,1} = \langle e_{1,1}, h^*_1 \rangle = \|h^*_1\|$, where $\langle a, b \rangle$ denotes the inner product of vector a and b, and $\|a\|$ denotes the norm of vector a. When m=2, it can be derived: $h^*_1 = \langle e_{1,2}, h^*_1 \rangle e_{1,2} + r_{22,2} e_{2,2}$. Take the norm of the both sides and $r_{11,1} = \|h^*_i\|$, it can be further derived as $$r_{11,1} = \|\langle e_{1,2}, h^*_i \rangle e_{1,2} + r_{22,2} e_{2,2}\|$$

As $e_{1,2}$ and $e_{2,2}$ are orthogonal and normalized to unit energy, $$r_{11,1} = \sqrt{|\langle e_{1,2}, h^*_1 \rangle|^2 + r_{22,2}^2}$$

As $|\langle e_{1,2}, h^*_1 \rangle|^2 > 0$ and $r_{22,2} > 0$, it is proven that $r_{11,1} > r_{22,2}$. When m=3, similarly, $h^*_1 = \langle e_{1,3}, h^*_1 \rangle e_{1,3} + \langle e_{2,3}, h^*_1 \rangle e_{2,3} + r_{33,3} e_{3,3}$, where $e_{1,3} = e_{1,2} = h^*_2 / \|h^*_2\|$ because line 2 is ordered as the first channel vector in both cases. Similar to the case of m=2, it can be derived as $$r_{22,2} = \|\langle e_{2,3}, h^*_1 \rangle e_{2,3} + r_{33,3} e_{3,3}\|$$

Similar to the case of m=2, $e_{2,3}$ and $e_{3,3}$ are orthogonal and normalized to unit energy, and $|\langle e_{2,3}, h^*_1 \rangle|^2 > 0$ and $r_{33,3} > 0$. So it is proven that:

$$r_{22,2} > r_{33,3}$$

Continuing with this process, it can be easily seen that:

$$r_{mm,n} = \|\langle e_{m,(m+1)}, h^*_1 \rangle e_{m,(m+1)} + r_{(m+1)(m+1),(m+1)} e_{(m+1),(m+1)}\|$$

So it is proven that:

$$r_{mm,n} > r_{(m+1)(m+1),(m+1)}$$

Figure 2:
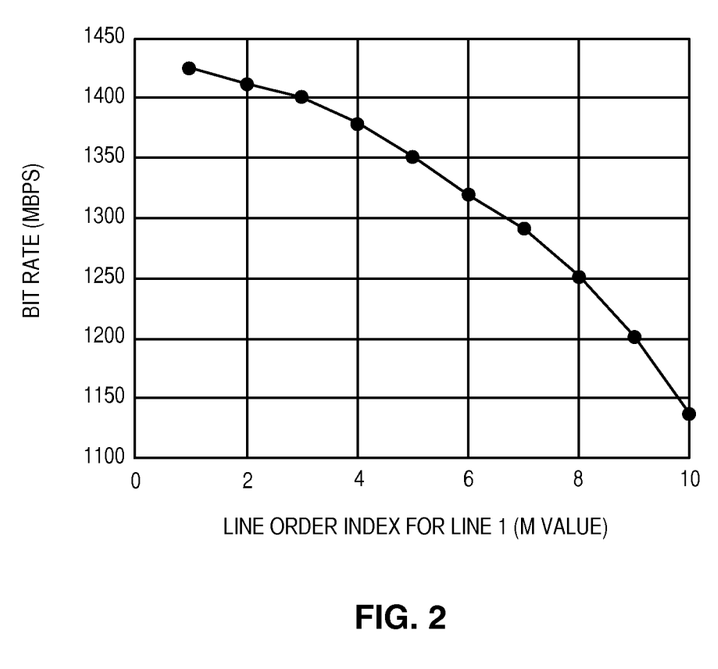
FIG. 2 is a graph of the bit rate of a line versus the line order index of the line.

FIG. 2 shows simulation results of the bit rates of line 1 when it is ordered as the $m^{th}$ channel vector, according to the scenario assumed in the proof. It is clearly shown that the bit rates decrease when the order m increases. In this case, the biggest variation is about 300 Megabits Per Second (Mbps) between m=1 and m=10. It should be noted that here only the tendency is proved, according to the scenario, that the line ordered first tends to achieve higher bit rates from the precoding. If other lines are not so regularly shifted as in this scenario, the corresponding channel gain may not strictly decrease. However, the overall tendency would remain valid.

As such, ordering in THP is an extra Degree of Freedom (DoF) to control the line performance. It is undesirable that the line performance varies depending on the line orders in an uncontrolled way. It would be desirable to have a scheme to control the data rate of each user based on the line ordering.

Figure 3:
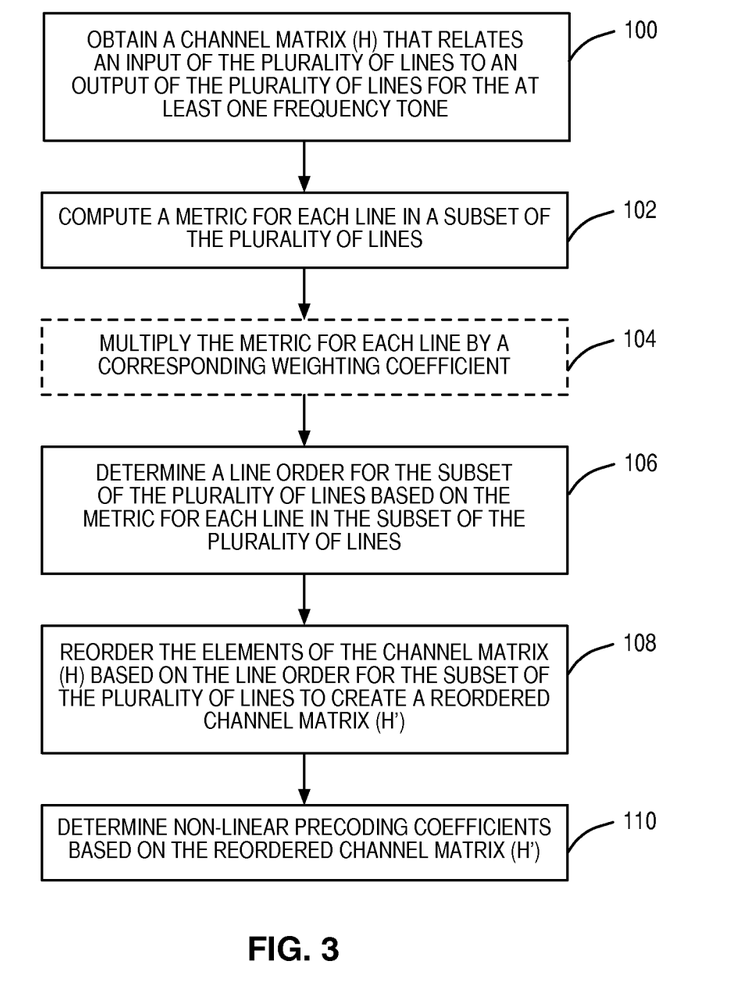
FIG. 3 illustrates a method for determining non-linear precoding coefficients based on a metric for each line according to some embodiments of the present disclosure.

Therefore, systems and methods for determining non-linear precoding coefficients are disclosed. FIG. 3 illustrates a method for determining non-linear precoding coefficients based on a metric for each line according to some embodiments of the present disclosure. In some embodiments, this method is performed by DSLAM 12, but the current disclosure is not limited thereto. Also, the precoding coefficients can be calculated for at least one frequency tone or a group of frequency tones. First, DSLAM 12 obtains a channel matrix, H, that relates an input of the lines to an output of the lines for the at least one frequency tone (step 100). As discussed above, the actual channel matrix may not be known. The systems and methods disclosed herein are equally applicable an estimated channel matrix.

Next, DSLAM 12 computes a metric for each line in a subset of the lines (step 102). In some embodiments, the subset of the lines includes all of the lines, and in other embodiments, the subset of the lines includes less than all of the lines. In some embodiments, DSLAM 12 may optionally multiply the metric for each line by a corresponding weighting coefficient (step 104). In some embodiments, each line in the subset of the lines belongs to one of a group, and for each line in the subset of the lines, the weighting coefficient is a predetermined value based on the group to which the line belongs. For example, this may be used to group lines together to be treated similarly to each other. In some embodiments, the weighting coefficient is based on the length of the line. In some embodiments, the weighting coefficient is based on a subscription level of a user of the line. For instance, if a user pays for a premium subscription, the line associated with that user may include a weighting coefficient that will be used in determining a line order, which tends to order this user first to increase this user's bit rate.

Returning to FIG. 3, the DSLAM 12 then determines a line order for the subset of the lines based on the metric for each line in the subset of the lines (step 106). Next, DSLAM 12 reorders elements of the channel matrix, H, based on the line order for the subset of the lines to create a reordered channel matrix, H' (step 108). Then DSLAM 12 determines the non-linear precoding coefficients based on the reordered channel matrix, H' (step 110).

Broadly, the main objective of FIG. 3 is to determine a metric for each line to control its order when performing THP. By changing a line's order, the line's data rate performance can be adjusted. In some embodiments, the optional weighting coefficient has an advantage that operators are able to control the bit rates of the lines by changing the weighting coefficients according to each operator's need. These methods may help the operators to simplify the process to profile their users for service provisioning. For example, the operators can simply group the lines with similar cable lengths and balance the rate between each group. The proposed methods can also be used to increase the bit rate for users who would like to pay more to receive higher bit rates. In this case, simply providing a larger weighting coefficient for the lines of these users would increase their bit rates.

Two broad strategies are disclosed herein with different levels of complexity. The first method is to sort the lines in a decreasing order by a weighted metric with respect to the projected channel vectors. This method is an iterative method deeply involved in the QR decomposition. This method sorts the projected channel vectors for the remaining unsorted lines on each step of the QR decomposition. As such, the complexity of this method is higher than the second method. This method is called projected sorting herein.

The second method is to sort the lines in a decreasing order by a weighted metric with respect to the original channel vectors. This method only requires sorting one time for each subset of the lines. So the complexity of this method is relatively low when compared to the projected sorting method. This method is called original sorting herein.

Figure 4:
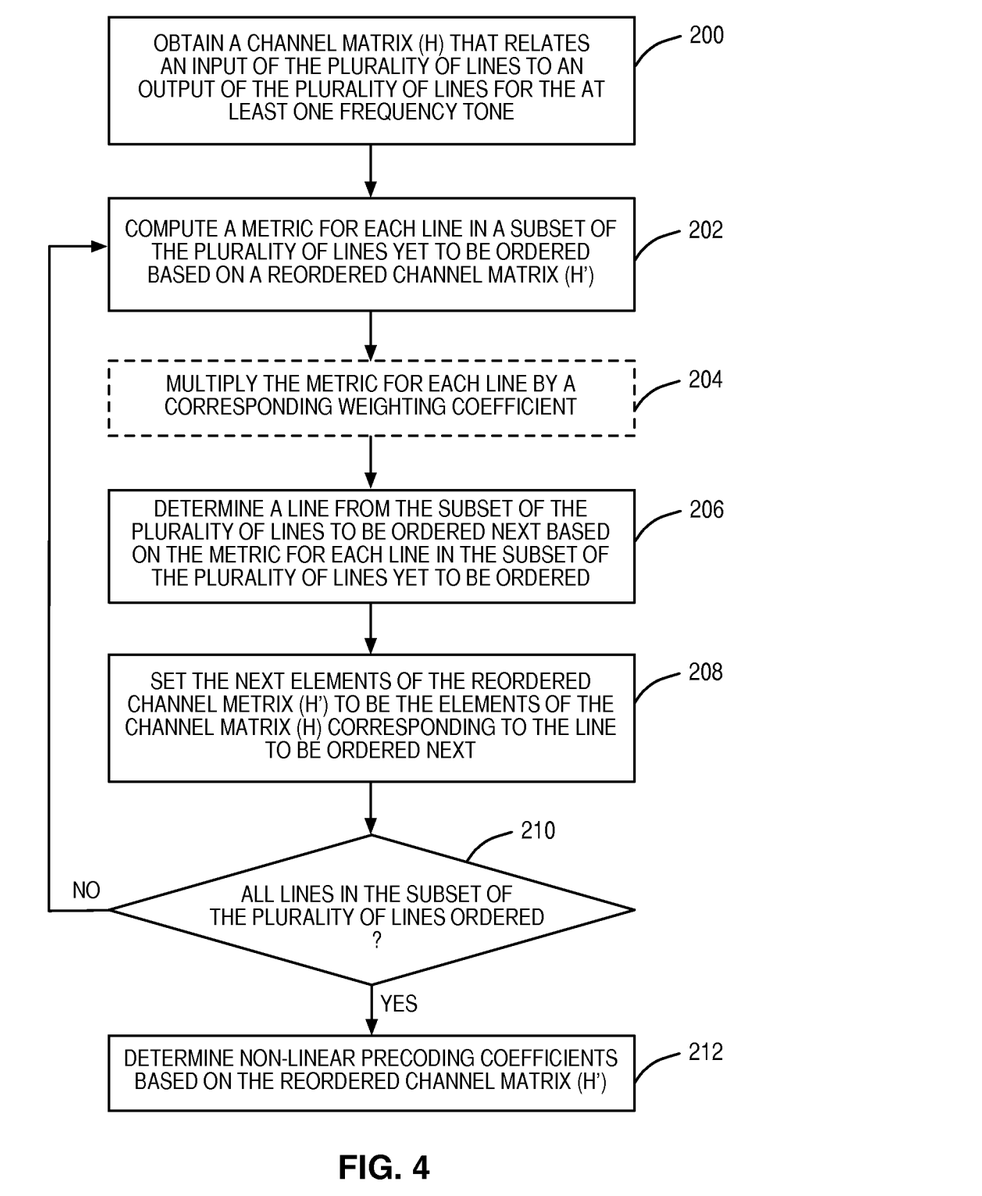
FIG. 4 illustrates a method for determining non-linear precoding coefficients by projected sorting according to some embodiments of the present disclosure.

FIG. 4 illustrates a method for determining non-linear precoding coefficients by projected sorting according to some embodiments of the present disclosure. DSLAM 12 first obtains a channel matrix, H, that relates an input of the lines to an output of the lines for the at least one frequency tone (step 200). Next, DSLAM 12 computes a metric for each line in a subset of the lines yet to be ordered based on a reordered channel matrix, H' (step 202). Thus, at each iteration, the reordered channel matrix, H', is updated with the next line to be ordered. The metric for the lines that still need to be ordered is calculated based on this updated, reordered channel matrix, H'. As in the previous method, DSLAM 12 may optionally multiply the metric for each line by a corresponding weighting coefficient (step 204). Next, DSLAM 12 determines a line from the subset of the lines to be ordered next based on the metric for each line in the subset of the lines yet to be ordered (step 206). Once the next line is determined, the next elements of the reordered channel matrix, H', are set to be the elements of the channel matrix, H, corresponding to the line to be ordered next (step 208). DSLAM 12 then checks if all lines in the subset of the lines are ordered (step 210). If not all of the lines in the subset of the lines are ordered, the method returns to step 202. If all of the lines in the subset of the lines are ordered, the DSLAM 12 determines the non-linear precoding coefficients based on the reordered channel matrix, H' (step 212).

Figure 5:
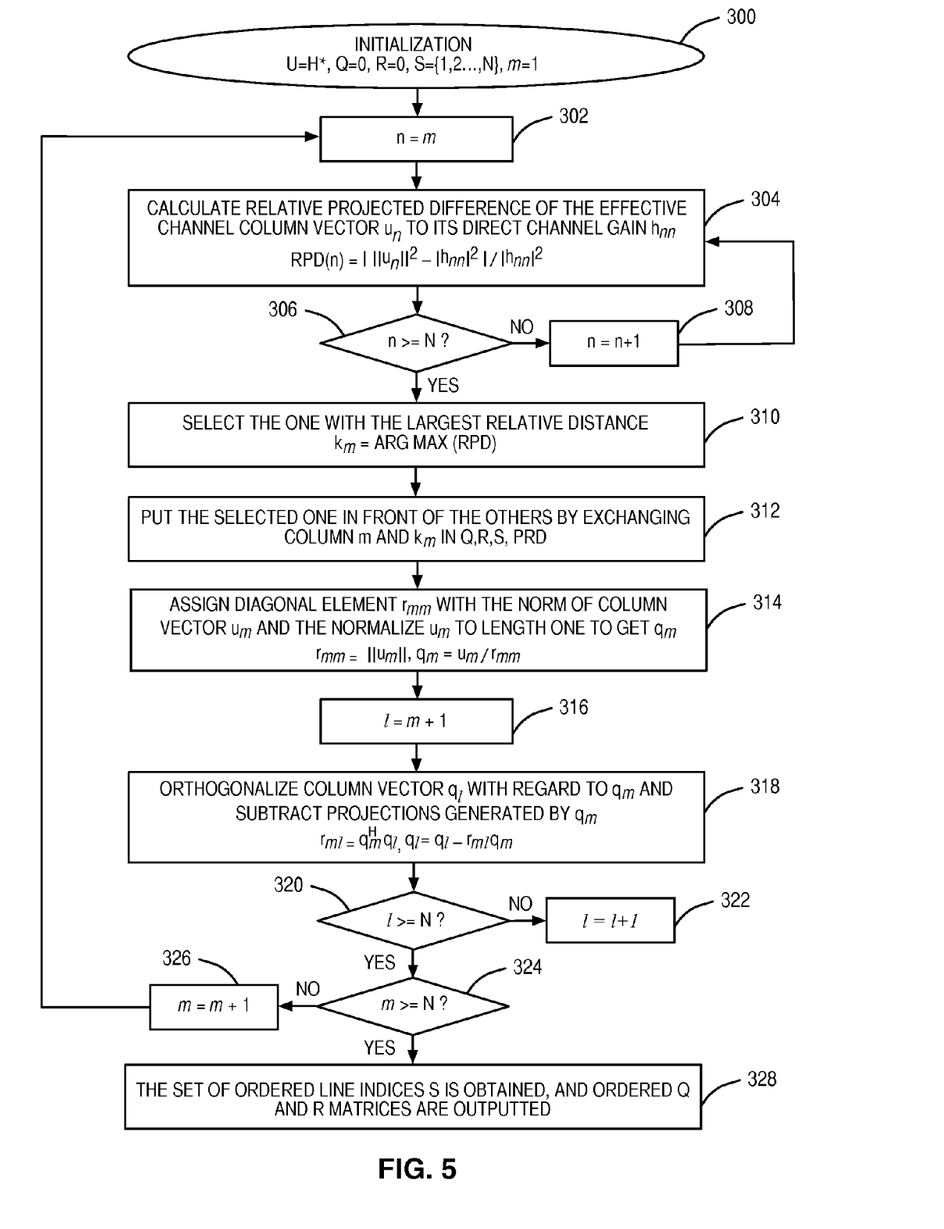
FIG. 5 illustrates a more detailed method for determining non-linear precoding coefficients by projected sorting according to some embodiments of the present disclosure.

FIG. 5 illustrates a more detailed method for determining non-linear precoding coefficients by projected sorting according to some embodiments of the present disclosure. Assuming the dimension of the channel matrix, H, is N×N, matrix U=H* is first initialized; the ordering set S with natural order as S=(1, . . . , N), Q=0 and R=0 (step 300). In this embodiment, the proposed projected sorting method is implemented iteratively inside the OR decomposition, for each step only the remaining users, which are not yet indexed, are taken into account.

For the $m^{th}$ step, the previous m−1 users are already indexed, and the remaining column vector which needs to be indexed is $u_n$ (n=m, . . . , N). Therefore, n is set to m (step 302). Note that in the first iteration, m=1. The Relative Projected Difference (RPD) of $u_n$ to its corresponding direct channel gain $h_{nn}$ is calculated (step 304) as:

$$RPD(n) = (\|u_n\|^2 - |h_{nn}|^2)/|h_{nn}|^2$$

If n is not greater than or equal to N (step 306), then there are still RPD values to be calculated. n is incremented (step 308) and the method returns to step 304 to calculate the next RPD value. If n is greater than or equal to N, then each RPD value has been calculated and the method selects the line with the largest RPD and assigns its index to $k_m$ (step 310). Then, the method puts the selected one in front of the others by exchanging column m and $k_m$ in Q, R, S, and PRD (step 312). Next, the diagonal element $r_{mm}$ is assigned as the norm of the newly obtained column vector $u_m$, that is, $r_{mm} = \|u_m\|$ and the orthonormal column vector $q_m$, is $u_m$ normalized to a unit energy by its norm as $q_m = u_m/r_{mm}$ (step 314). Index variable l is set to m+1 (step 316). Subsequently, the columns $u_l$ (l=m+1, . . . , N) are orthogonalized with respect to the normalized $q_m$ as $r_{ml} = q_m^H q_l$, $q_l = q_l - r_{ml} q_m$ (step 318). If l is not greater than or equal to N (step 320), then there are still columns that need to be orthogonalized. Therefore, l is incremented (step 322) and the method returns to step 318 to orthogonalize the next column. If l is greater than or equal to N, column orthogonalization is complete. Next, if m is less than N (step 324), there are more lines to order. Therefore, m is incremented (step 326) and the method returns to step 302. If m is greater than or equal to N, the method is complete, and the set of ordered line indices, S, is obtained and ordered Q and R matrices are outputted (step 328).

Figure 6:
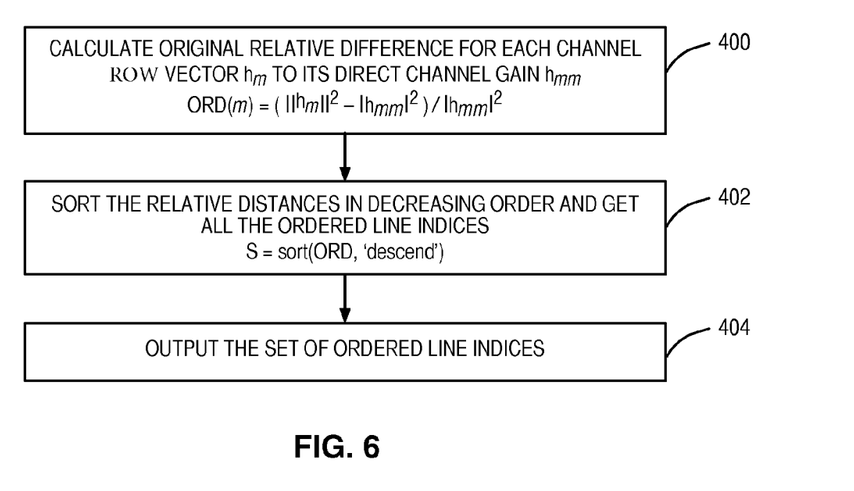
FIG. 6 illustrates a method for determining non-linear precoding coefficients by original sorting according to some embodiments of the present disclosure.

The projected sorting method disclosed in FIG. 5 is implemented inside the QR decomposition. In some embodiments, this may create a complexity issue because the metrics must be computed and sorted iteratively. Specifically, in step i, the metrics for N−i+1 remaining lines need to be calculated and sorted, where N is the number of lines. Therefore, FIG. 6 illustrates a method for determining non-linear precoding coefficients by original sorting according to some embodiments of the present disclosure. This embodiment follows a similar principle as the embodiments discussed in relation to FIGS. 4 and 5, but with less computational complexity. Instead of using the projected channel column vector $u_m$ for corresponding H* to compute the metrics, the original channel row vector $h_m$ of H is used to calculate its relative distance from its corresponding direct channel gain $h_{mm}$. The sorting metric in this embodiment is called the Original Relative Difference (ORD), which is expressed as:

$$ORD(m) = (\|h_m\|^2 - |h_{mm}|^2)/|h_{mm}|^2$$

The ORD for each channel row vector $h_m$ to its direct channel gain $h_{mm}$ is calculated (step 400). Next, the method sorts the relative distances in decreasing order and gets all the ordered line indices (step 402). The method then outputs the set of ordered line indices (step 404). Note that, in other embodiments, the column vectors of H may also be used in the metric calculation, because H is more or less symmetric, i.e. $|h_{ij}| \approx |h_{ij}|$. These line indices may be used to reorder the channel matrix, H, and perform the standard QR decomposition of H*, for example. Since only one metric for each line is calculated and only one sorting operation is performed, the complexity of the method illustrated in FIG. 6 is reduced compared to the methods of FIGS. 4 and 5.

In step 104 of FIG. 3 and in step 204 of FIG. 4, the metric may optionally be multiplied by a corresponding weighting coefficient. As an example implementation of this, a weighting vector w can be introduced for better control of the line order. In this example, the weighting vector includes a weighting coefficient for each line A weighted metric that could be used for the projected sorting is implemented in each iteration n by:

$$RPD(n) = w(n)*(\|u_n\|^2 - |h_{nn}|^2)/|h_{nn}|^2, n = m, m+1, \ldots, N$$

Similarly, a weighted metric that could be used for original sorting is implemented for all channel column vectors $h_m$ with m=1,2, . . . , N as:

$$ORD(m) = w(m)*(\|h_m\|^2 - |h_{mm}|^2)/|h_{mm}|^2$$

In both methods, the lines with higher weighting coefficients will have higher priorities to be ordered first. The value of the weighting vector w can be either predefined or calculated according to the channel matrix, e.g. direct channel gain. By doing this, different index priorities are allocated, and lines can be grouped according to different quality of service requirements. The weighting vector w is especially useful for the near-far scenario to balance the long lines and the short lines separately to avoid too much penalty to short lines.

Figure 7:
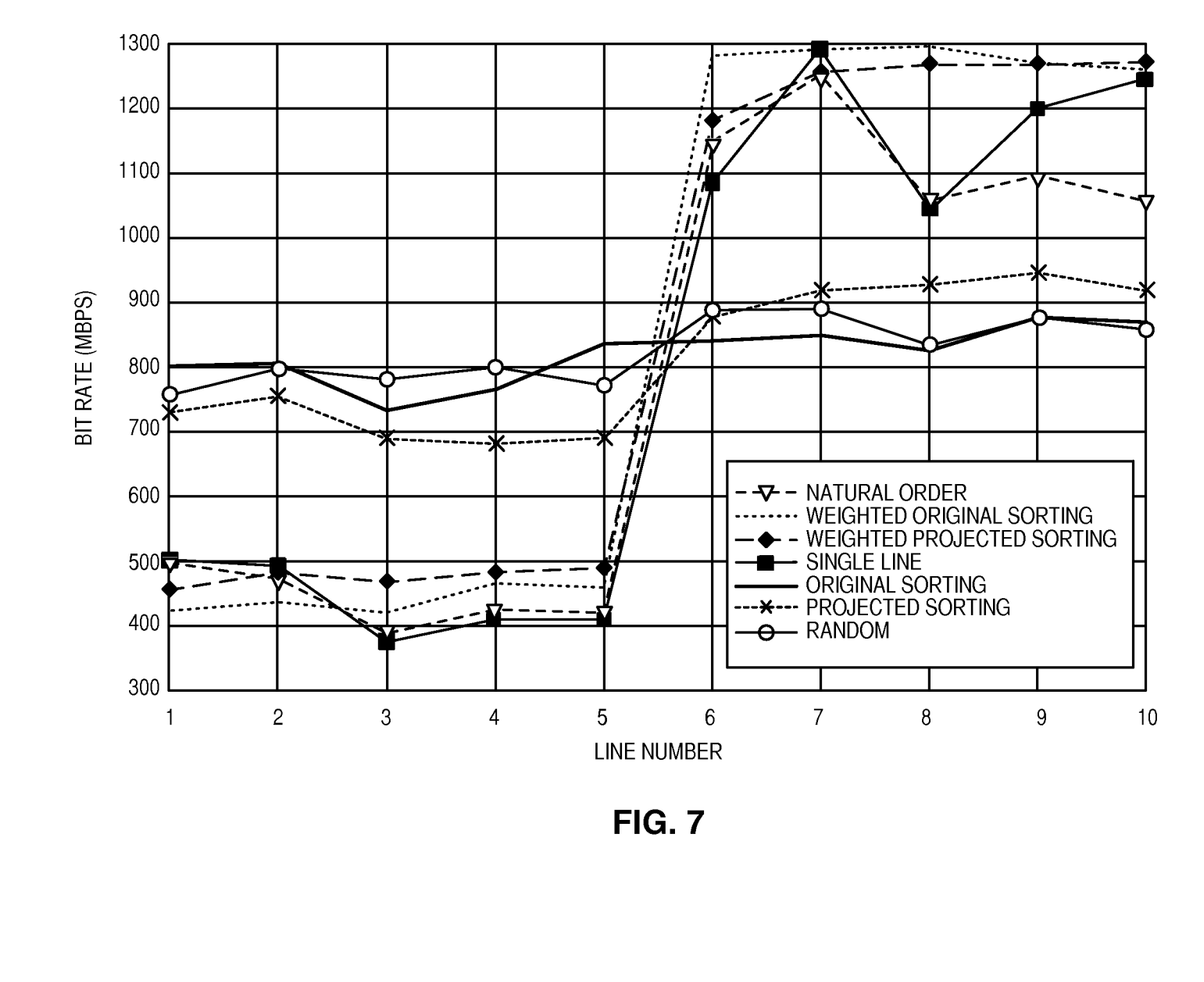
FIG. 7 is a graph of the bit rate of lines using various line orderings according to some embodiments of the present disclosure.

FIG. 7 is a graph of the bit rate of a line using various line orderings according to some embodiments of the present disclosure. In this example, lines 1-5 are 200 meters long, and lines 6-10 are 100 meters long.

Natural order shows the bit rates when the lines are just taken in the order that the experimental setup uses. This natural order already had longer lines first in the order. This near-far scenario can be seen in the steep discontinuity between the first five lines and the last five lines. Single line shows the bit rates when there is no crosstalk as if each line were a single line. Again, the near-far scenario can be seen as the bit rate is lower for the longer lines.

Random order shows a fairly consistent bit rate across all of the lines and the near-far scenario is diminished. Random order applies a random line order with a uniform distribution at each tone. As each line is ordered first at some tones and is ordered last at other tones, this statistically smooths the performance variation due to the ordering. The more gain from ordering a line first in some tones compensates the less gain from ordering the line last in some other tones. Overall, the bit rates are balanced. But, there are several disadvantages of the random ordering scheme. The random ordering scheme needs to generate a big amount of random numbers. For instance, if 4,000 tones are used, the scheme needs to randomly generate 4,000 orders. This may cause a complexity issue.

Also, the random ordering causes a statistical variation on individual lines for different instances of executions. For different times of execution, the line ordering for each line will be different and, therefore, so are the bit rates of each line. This means that a user could have a very different bit rate than last time after rebooting the CPE 14. This performance variation is typically undesirable.

Returning to FIG. 7, the original sorting and projected sorting bit rates are similar to the random ordering with relatively smooth bit rates across the lines. Note that the random ordering scheme, the original sorting, and the projected sorting all give significant enhancements to the bit rates of the longer lines while significantly reducing the bit rates of the shorter lines. This may not be desirable from the operator's point of view. In this case, the weighted original sorting and the weighted projected sorting are shown. For both of these, the weighting coefficients separated the lines into two groups where the first five lines were weighted so that they would tend to be ordered last, while the last five lines were weighted so that they would tend to be ordered first. Specifically, lines 6-10 are set with one large weight (same weight factor for lines 6-10), and therefore lines 6-10 are ordered before lines 1-5. Within each of these two groups, the proposed methods balanced the bit rate between lines. In this way, the lines all have bit rates similar to the other lines in the same group without the significant enhancements or reductions that occur when the short and long lines are grouped together. Other grouping schemes could be used to implement whatever policy the operator desires.

Figure 8:
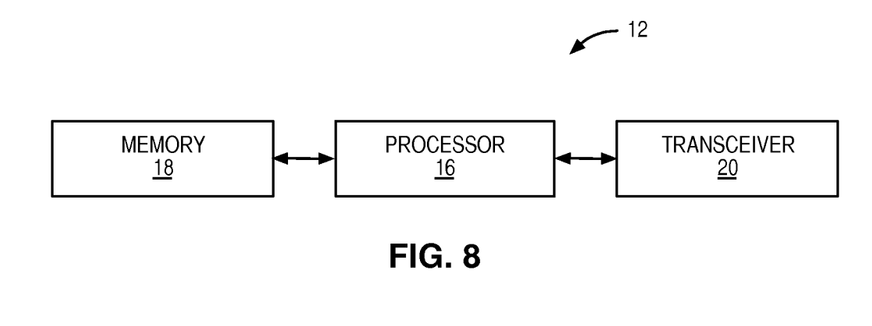
FIG. 8 is a block diagram of a Digital Subscriber Line Access Multiplexer (DSLAM) according to some embodiments of the present disclosure.

FIG. 8 is a block diagram of a DSLAM 12 according to some embodiments of the present disclosure. As illustrated, the DSLAM 12 includes a processor 16, memory 18, and a transceiver 20. In some embodiments, the DSLAM 12, or the functionality of the DSLAM 12 described with respect to any one of the embodiments described herein, is implemented in software that is stored in, e.g., the memory 18 and executed by the processor 16. The transceiver 20 is used to transmit and receive signals and may include one or more components that connect the DSLAM 12 to other systems such as CPEs 14.

In some embodiments, a computer program including instructions which, when executed by at least one processor, causes the at least one processor to carry out the functionality of the DSLAM 12 according to any one of the embodiments described herein is provided. In some embodiments, a carrier containing the aforementioned computer program product is provided. The carrier is one of an electronic signal, an optical signal, a radio signal, or a computer readable storage medium (e.g., a non-transitory computer readable medium such as the memory 18).

Figure 9:
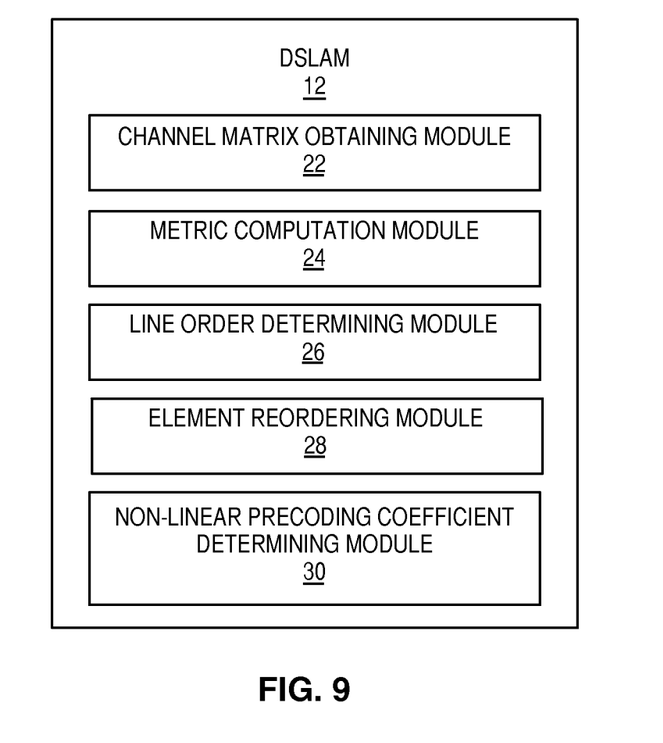
FIG. 9 is a is a block diagram of a DSLAM including a channel matrix obtaining module, a metric computation module, a line order determining module, an element reordering module, and a non-linear precoding coefficient determining module according to some embodiments of the present disclosure.

FIG. 9 is a block diagram of DSLAM 12 according to some embodiments of the present disclosure. As illustrated, the DSLAM 12 includes a channel matrix obtaining module 22, a metric computation module 24, a line order determining module 26, an element reordering module 28, and a non-linear precoding coefficient determining module 30 that are each implemented in software that, when executed by a processor of the DSLAM 12, causes the DSLAM 12 to operate according to one of the embodiments described herein. The channel matrix obtaining module 22 operates to obtain a channel matrix, as described above with respect to, for example, steps 100 or 200. The metric computation module 24 operates to compute a metric for each line in a subset as discussed above with respect to, for example, steps 102, 202, 304, or 400. The line order determining module 26 operates to determine a line ordering, as described above with respect to, for example, steps 106, 206, 310, or 402. The element reordering module 28 operates to reorder elements of the channel matrix, as described above with respect to, for example, steps 108, 208, or 312. The non-linear precoding coefficient determining module 30 operates to determine the non-linear precoding coefficients, as described above with respect to, for example, steps 110, 212, 314, or 318.

The following acronyms are used throughout this disclosure.

CPE Customer Premises Equipment
CWDD Column-Wise Diagonal Dominant
DoF Degree of Freedom
DSL Digital Subscriber Line
DSLAM Digital Subscriber Line Access Multiplexer
FTTdp Fiber-to-the-Distribution-Point
Gbps Gigabit Per Second
ITU International Telecommunication Union
ITU-T ITU-Telecommunication Standardization Sector
Mbps Megabits Per Second
MHz Megahertz
ORD Original Relative Difference
PAM Pulse-Amplitude Modulation
PSD Power Spectral Density
QAM Quadrature-Amplitude Modulation
RPD Relative Projected Difference
RWDD Row-Wise Diagonal Dominant
SNR Signal-to-Noise Ratio
THP Tomlinson-Harashima Precoder
VCE Vectoring Control Entity
VDSL2 Very-high-bit-rate DSL 2
ZF Zero-Forcing Those skilled in the art will recognize improvements and modifications to the embodiments of the present disclosure. All such improvements and modifications are considered within the scope of the concepts disclosed herein and the claims that follow.

What is claimed is:

1. A method of determining non-linear precoding coefficients for transmitting at least one frequency tone on a plurality of lines comprising:
    obtaining a channel matrix, H, that relates an input of the plurality of lines to an output of the plurality of lines for the at least one frequency tone;

computing a metric for each line in a subset of the plurality of lines;

determining a line order for the subset of the plurality of lines based on the metric for each line in the subset of the plurality of lines;

reordering elements of the channel matrix, H, based on the line order for the subset of the plurality of lines to create a reordered channel matrix, H'; and determining the non-linear precoding coefficients based on the reordered channel matrix, H'.

2. The method of claim 1 wherein the subset of the plurality of lines comprises all of the plurality of lines.

3. The method of claim 1 wherein the subset of the plurality of lines comprises less than all of the plurality of lines.

4. The method of claim 1 wherein computing the metric for each line in the subset of the plurality of lines comprises computing the metric for each line in the subset of the plurality of lines based on the elements of the channel matrix, H, corresponding to each line.

5. The method of claim 4 wherein computing the metric for each line in the subset of the plurality of lines comprises computing the metric for each line in the subset of the plurality of lines as a value proportional to a difference between a total energy of a channel vector and a direct channel energy of the channel vector corresponding to each line.

6. The method of claim 5 wherein computing the metric for each line in the subset of the plurality of lines comprises computing the metric for each line in the subset of the plurality of lines as $(\|h_i\|^2 - |h_{ii}|^2)/|h_{ii}|^2$ where $h_i$ is the channel vector corresponding to each line and $h_{ii}$ is the direct channel gain of the channel vector corresponding to each line.

7. The method of claim 6 wherein determining the line order comprises ordering the subset of the plurality of lines in decreasing order of the metric for each line in the subset of the plurality of lines.

8. The method of claim 1 further comprising multiplying the metric for each line by a corresponding weighting coefficient prior to determining the line order for the subset of the plurality of lines.

9. The method of claim 8 wherein each line in the subset of the plurality of lines belongs to one of a plurality of groups and for each line in the subset of the plurality of lines, the weighting coefficient is a predetermined value based on the group to which the line belongs.

10. The method of claim 8 wherein for each line in the subset of the plurality of lines, the weighting coefficient is based on the length of the line.

11. The method of claim 8 wherein for each line in the subset of the plurality of lines, the weighting coefficient is based on a subscription level of a user of the line.

12. The method of claim 1 wherein the at least one frequency tone is a group of frequency tones.

13. The method of claim 1 wherein the at least one frequency tone is a single frequency tone.

14. The method of claim 1 where each of the at least one frequency tone is at least 100 Megahertz, MHz.

15. The method of claim 1 wherein determining the non-linear precoding coefficients comprises determining the non-linear precoding coefficients for Tomlinson-Harashima precoding.

16. The method of claim 1 where each of the plurality of lines is a digital subscriber line, DSL, operating according to the G.fast standard.

17. A Digital Subscriber Line Access Multiplexer, DSLAM, comprising:

a transceiver for transmitting at least one frequency tone on a plurality of lines;

at least one processor; and memory containing software executable by the at least one processor whereby the DSLAM is operative to:

obtain a channel matrix, H, that relates an input of the plurality of lines to an output of the plurality of lines for the at least one frequency tone;

compute a metric for each line in a subset of the plurality of lines;

determine a line order for the subset of the plurality of lines based on the metric for each line in the subset of the plurality of lines;

reorder elements of the channel matrix, H, based on the line order for the subset of the plurality of lines to create a reordered channel matrix, H'; and determine non-linear precoding coefficients based on the reordered channel matrix, H'; where the DSLAM further performs the following as part of the determining, the line order for the subset of the plurality of lines, comprising, for each line in the subset of the plurality of lines: determining a line from the subset of the plurality of lines to be ordered next based on the metric for each line in the subset of the plurality of lines yet to be ordered; setting the next elements of the reordered channel matrix, H' to be the elements of the channel matrix, H, corresponding to the line to be ordered next; and computing the metric for each line in the subset of the plurality of lines yet to be ordered based on the reordered channel matrix, H'.

* * * * *